June 25, 1935.  J. H. DAVIS  2,006,265
METHOD OF AND APPARATUS FOR TREATING GRAIN FOR
EXTERMINATION OF INSECT LIFE THEREIN
Filed April 29, 1932.  4 Sheets-Sheet 4

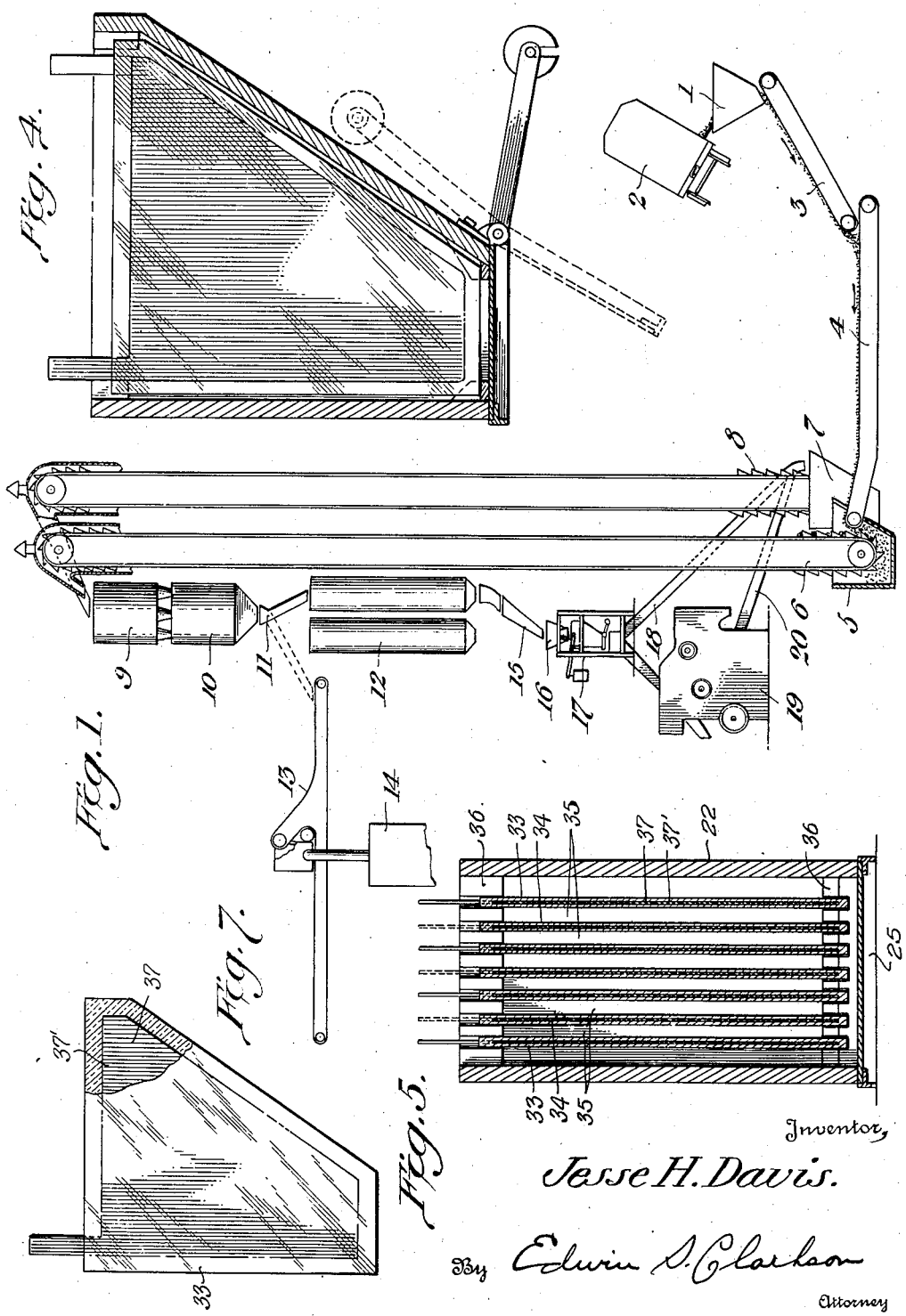

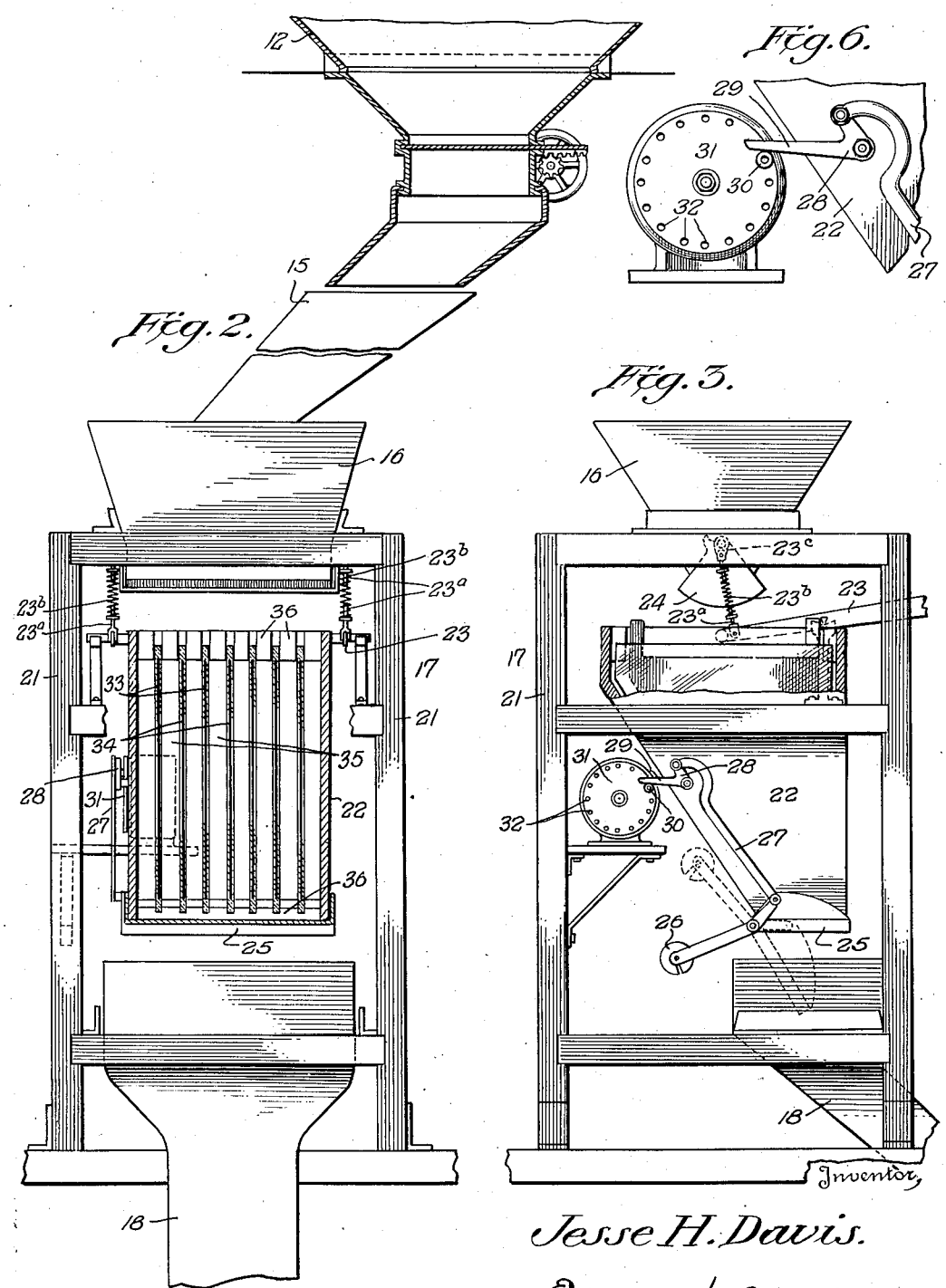

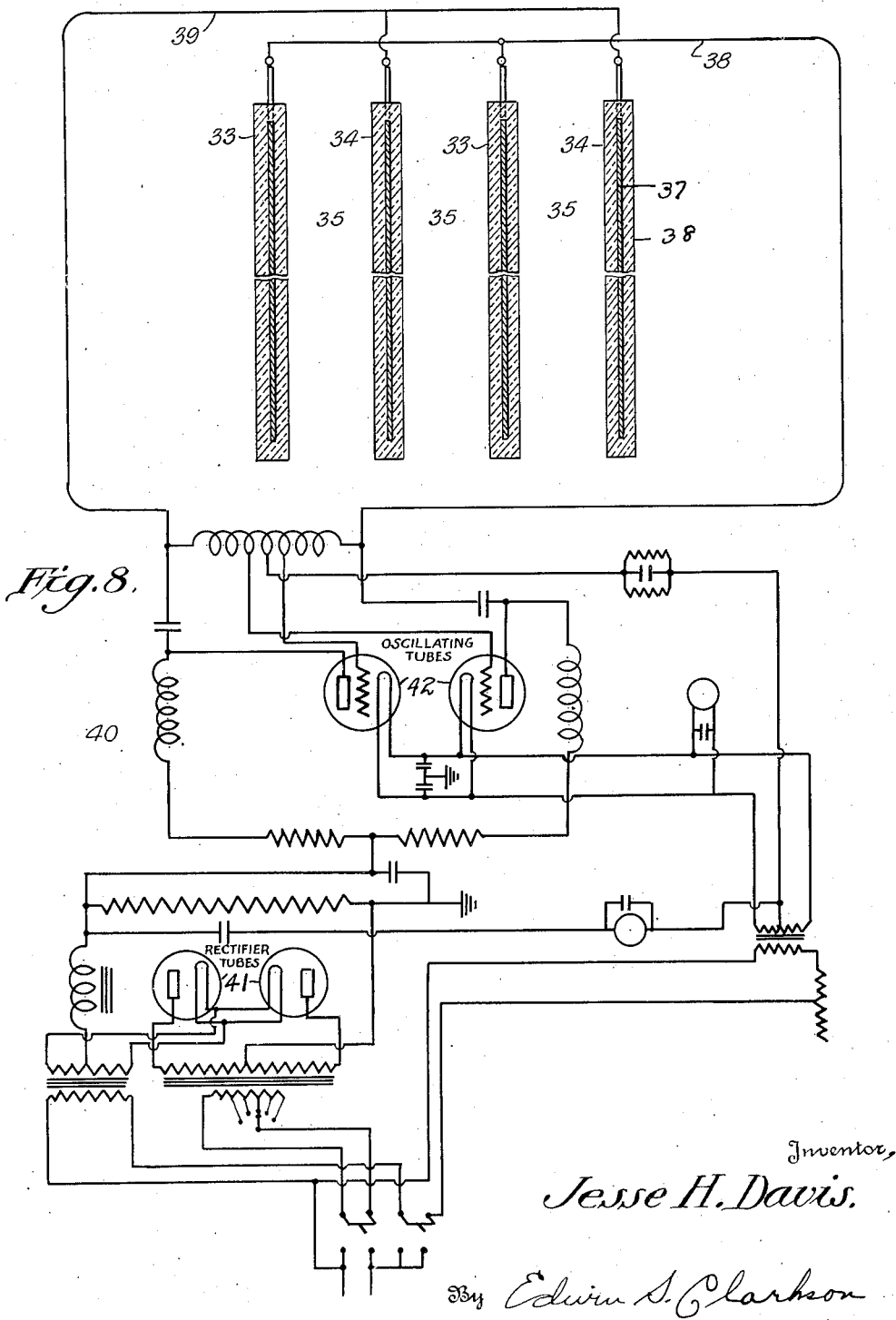

Inventor
Jesse H. Davis.

By Edwin S. Clarkson
Attorney

Patented June 25, 1935

2,006,265

UNITED STATES PATENT OFFICE 2,006,265

METHOD OF AND APPARATUS FOR TREATING GRAIN FOR EXTERMINATION OF INSECT LIFE THEREIN

Jesse H. Davis, Baltimore, Md.

Application April 29, 1932, Serial No. 608,311

21 Claims. (Cl. 175—311)

This invention relates to a method of and apparatus for treating grain in bulk and in desired quantities for the purpose of exterminating grain weevil, moths, and other like injurious insects, and their larvæ and pupa, which prey upon wheat and other stored grain. More particularly the invention relates to an apparatus for use in treating grain while in process of being loaded into elevators or other storage houses from railway cars, motor vehicles or other carrier vehicles, marine vessels, etc., or while being unloaded from an elevator or like storage place into vehicles of the character described for delivery transportation, or while being transferred from one bin or receptacle to another or from one point to another of an elevator or other storage house.

Great losses are caused, in storage of wheat and other grain in elevators, granaries and other storage houses, due to the partial or complete destruction or quality impairment of the grain stored therein as a result of the depredations of the weevil, grain moth and similar insects, as well as to the methods heretofore employed in attempts to curb or prevent such depredations.

When the grain is received at an elevator for storage, tests are made for its classification under the United States grain act. Samples of the grain are taken according to regulations prescribed by the Department of Agriculture, and the classification is made according to what is shown by the samples. The grain is classified or graded in from one to six grades, dependent upon quality and condition. If it is found to be weevily or otherwise infested with insect life it is classified as it ordinarily would be, except that it is noted as being weevily. The proportion of weevily grain or other insect-infested grain contained in bulk grain received from different portions of the United States and Canada varies in percentage. Grain received at an elevator or storage house from marine vessels, wagons or trucks is sometimes, irrespective of condition, delivered to the elevator without being subjected to insecticide treatment. In other cases, whenever it has been found that a load of grain arriving at an elevator for storage is weevily it has been the practice to treat it chemically then and there before it is unloaded from the car. This treatment usually consists in subjecting the grain to the action of any one or more of a number of fumigants or gases commonly used for killing insects in grain, but these methods have not been found wholly effective or reliable and have generally proved to be objectionable on account of fire hazard, excessive cost, toxicity to man, or deleterious effect on the grain, and operators have found it necessary to resort to handling the grain in order to preserve it from destruction. Whatever the percentage of insect life which may exist in the grain at the time of storage may be, it is highly desirable to treat the grain at this time for the destruction of the insect life therein, as this percentage is greatly increased after a period of storage, owing to the development of natural heat in the grain and the resultant great multiplication of insect life due to this and other factors therein. In all modern elevators very elaborate means are accordingly provided for automatically indicating the extent of the heating of the grain in the storage compartments or bins. When this heating of the grain has reached certain proportions, it is necessary to run grain from one elevator bin to another for cooling and airing in order to maintain the grain at a sufficiently low temperature to reduce insect activity. Such operations of re-handling the grain for cooling and airing must be repeated at intervals at a considerable cost of time and labor. These re-handling operations cause dockage losses and drying of the grain, and it has been figured in the operation of elevators at Locust Point, Maryland, that a loss of weight of .46 of 1% of the amount of grain is sustained at each handling, so that, when the grain is handled many times, as often required, the loss in weight alone from such cooling and airing actions involves a considerable percentage of the total value of the grain. In making an estimate of losses occurring as a result of weight depreciation alone, due to cooling and airing methods at the Locust Point grain elevators, based upon treatment of about two million bushels of grain which has been stored for some time, it was found that this grain had been handled for cooling and airing as many as thirteen times, and that the loss in weight due to such handling, dockage and other causes, such as the drying of the grain by contact with air in its travel over belts and through spouts, aggregated approximately 6½% of the original weight of the grain, so that even at the low valuation of fifty cents per bushel, the loss due to decrease in weight alone runs into very large figures, which would be multiplied many times in the handling of the grain for lengthy periods. When to this item of loss is added the labor and operation of the machinery to re-handle the grain, and the losses due to depredation of the insects with which it is infested, it can be seen that the value of grains stored for any length of time is materially decreased as a result of the dual effect of the depredations of insects and the measures taken to reduce such depredations and which are necessary in order to preevnt total loss of the grain. As no method of treatment heretofore used, so far as I am aware, has been effective in destroying all insects contained in grain which is in storage, or reducing insect life in the grain to a degree where it is not a source of great trouble and expense, the ineffective treatment operations heretofore employed must be carried on, at great expense, in order to keep the losses as low as possible.

One object of my invention is to provide a method and apparatus operable in the line of transit of grain and employing the space field effect of electrical high frequency oscillations as a destructive agent whereby grain may be rapidly, easily, economically and efficiently treated to destroy with certainty all insect life therein.

A further object of my invention is to provide an apparatus of the character described whereby grain in process of being unloaded from a carrier vehicle into an elevator or granary for storage may, during the unloading operation or while it is in transit, be treated for the destruction of insect life therein at a time desirable for the purpose in order to prevent the increase of insect life commonly occurring after the grain is stored.

A still further object of my invention is to provide an apparatus of the character described whereby the grain transferred from carrier vehicles to the bins of an elevator or granary will be wholly relieved of insect life or relieved to such an extent as to avoid or reduce to a minimum the frequent cooling and airing steps heretofore required, so as to not only prevent the losses due to depredations of the insects, but also the losses in weight due to cooling and airing treatments.

A still further object of my invention is to provide an apparatus of the character described whereby the treated grain in course of loading transit may be subjected or not to cleaning treatment.

A still further object of my invention is to provide an insect exterminating apparatus which will be automatic in action and whereby a very large amount of grain may be treated within any given period of time.

A still further object of my invention is to provide an apparatus of the character and for the purpose described which may be used without fire hazard or liability of tainting or otherwise injuring the grain treated.

A still further object of my invention is to provide an apparatus of the character and for the purpose described which is based upon the method of employing high frequency electrical oscillations for the destruction of insect life which I have discovered and means for the use of which I have invented, as set forth in my prior application filed December 10, 1931, Serial No. 580,170.

The present application pertains broadly to a method and means designed for use in a grain feed system for treating the grain and to a tank or box type of exterminator comprising such means for carrying the invention into practical effect, while in a copending application executed of even date herewith I have disclosed and claimed a similar method and system employing a "tube" type of exterminator as a means for carrying the invention into practical effect.

In the accompanying drawings showing one form of apparatus for carrying my invention into practical effect,—

Fig. 1 is a diagrammatic side elevation of a grain feed apparatus, as designed for use in an elevator or granary, embodying my improved exterminator.

Fig. 2 is a view in front elevation of the exterminator and certain coacting parts of the feed system.

Fig. 3 is a view in side elevation of the insect exterminator.

Figs. 4 and 5 are, respectively, vertical front-to-rear and vertical transverse sections through the exterminator on an enlarged scale.

Fig. 6 is a detail view of the motor driven trip device.

Fig. 7 is a view in side elevation of one of the electrodes on an enlarged scale.

Fig. 8 is a diagrammatic view of the exterminator and associated means for producing high frequency oscillations.

Figure 9:
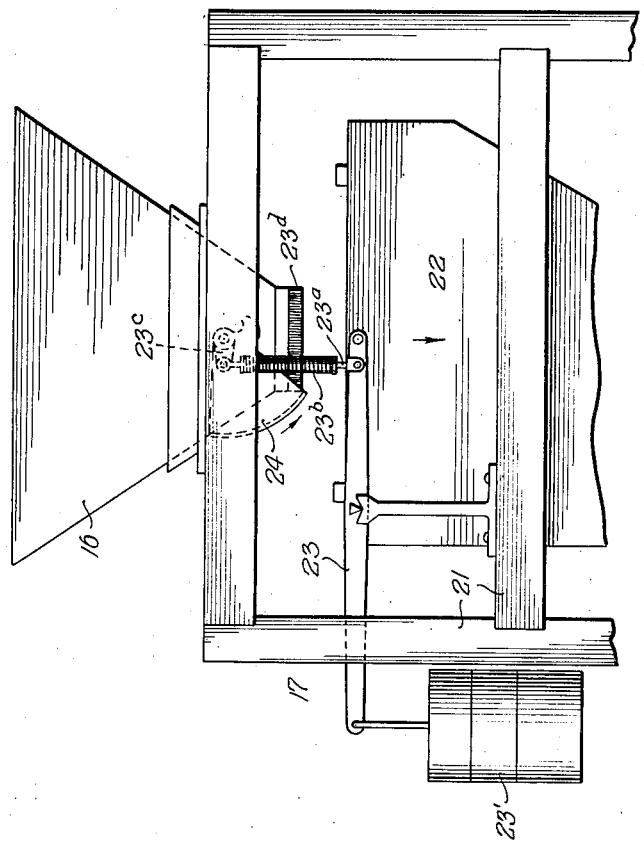
Fig. 9 is a view showing the counterweight support for the exterminator and discharge valve of the hopper controlled thereby.

In the structural organization disclosed, for purposes of exemplification, a receiver 1 is shown arranged at a dumping point for the reception of the grain discharging from the railway car or other carrier vehicle 2, and from which the grain is transferred by means of belt or other conveyors 3 and 4 to the boot 5 of the receiving leg 6 of a hoisting device or elevator, also shown as including a boot 7 and separator leg 8, said legs 6 and 8 being arranged to deliver the elevated grain to weighing scales 9 of any ordinary or approved construction, from which the weighed grain discharges into a transfer hopper 10.

The hopper 10 is provided with a swivel spout 11 which may be adjusted to a position for delivering the grain to a temporary storage bin or receptacle 12, where the grain is to be treated prior to delivery to the storage bins of the elevator, or which may be adjusted to a position for transferring the grain directly from the hopper 10 to a belt or conveyor 13 for direct delivery of the grain to the storage bins 14 of the elevator, one of which is shown.

The temporary storage bin or receptacle 12 may be of suitable capacity, and is designed for the reception of the grain to be treated for the extermination of weevil or other insect life therein. This bin or receptacle 12 is provided with a spout 15 for discharge of the grain therefrom by gravity into a hopper 16 at the top of the insect exterminator 17, in which the grain is treated. This exterminator, the construction of which is hereinafter described in detail, is provided with an outlet for the discharge of the treated grain to a swivel spout 18. This spout 18 is adjustable for feeding the treated grain either to a cleaner or separator 19, when it is necessary to clean the grain prior to delivery to the bins 14, or for delivering the grain directly from the exterminator to the boot 7 when it is desired to transfer the grain directly from the exterminator to the hopper 10 either for re-circulation through the exterminator or to the bins 14 without cleaning when cleaning is unnecessary. The cleaner 19 may be of any of the constructions in common use or suitable for the purpose, and, therefore, a detailed description of the same is unnecessary. A spout or other suitable conductor 20 conducts the cleaned grain from the separator to the boot 7.

The exterminator 17 is of tank or box type and designed for the gravity flow of the grain to be treated, preferably in a plurality of streams, therethrough. It comprises a suitable framework 21 which supports the hopper 16, spout 18 and the tank or box-like casing 22 of the exterminator. The casing 22 is preferably, but not necessarily, funnel-shaped or of tapering form from top to bottom, so as to provide a treatment receptacle having a wide top entrance end and a reduced bottom outlet or discharge end, as shown, the inlet end being arranged to receive the grain from the hopper 16 and the outlet end to discharge the grain after treatment into the spout 18. As shown, the casing 22 is pivotally supported by a counterweight lever 23 from the frame 21, which lever carries a counterweight 23' at one end and at its opposite end is pivoted to the casing 22 and to a rod connection 23ᵃ, having associated therewith a shock absorbing spring 23ᵇ, and which couples the lever to the actuating crank 23ᶜ of a swinging segmental dump valve 24 controlling the discharge of the grain from the hopper 16 to the casing, the outlet end of the hopper 16 being provided with a brush guard 23ᵈ to prevent crushing of the grain. The casing 22 thus serves as a weighing receptacle to receive a predetermined amount of grain controlled by its capacity and the action of the counterweight 23' and is mounted to rise and fall to control the movement of the valve 24 and the flow of grain thereto from the hopper 16. When the casing 22 is at its upper or unloaded position, to which position it is raised by the weight 23' when the treated grain is discharged therefrom, valve 24 is opened for the feed of grain thereto from hopper 16. When the casing is filled with grain, however, it descends under the weight thereof to a lowered position against the resistance of the counterweight, thereby closing the valve 24 after delivery of a measured amount of grain from the hopper 16 to cut off the feed of grain to the exterminator while the grain therein is being treated. In order to ensure retention of the grain for the predetermined treatment period in the exterminator and the discharge of the grain at the end of such period, an automatic dump valve 25 of suitable type is provided at the outlet end of the exterminator casing. This valve 25, as shown, is normally maintained in closed position by the action of a counterweight 26 and is opened at the predetermined time period by means of a time-controlled motor driven dumping or trip device comprising a rod 27 operatively connecting the valve 25 with a pivoted actuating lever 28 having an arm 29 arranged to be engaged by a striker or trip pin 30 on a motor driven rotary trip member 31. This member 31 may be suitably operated for a working action by or from any source of electric or other power. The pin 30 is engageable with any one of an annular series of spaced openings 32 in the member 31 whereby the trip device may be regulated to operate the dump valve automatically after the lapse of a certain time in seconds or minutes, depending upon the character of the grain treated, the frequency of the high frequency oscillations employed, or other working conditions.

Arranged in working pairs within the exterminator casing is a multiple plate condenser comprising sets of electrodes 33 and 34, disposed vertically therein in the form of partition plates or plate-like elements, sub-dividing the casing into a plurality of flow channels and space-charge fields 35. These spaces or channels communicate at their upper ends with the inlet of the casing and at their lower ends with the outlet of the casing, whereby on each discharge motion of the dump valve all the treated streams of grain are discharged from the channels and the channels then filled with further charges of grain to be treated by the automatic feed action of the valve 24. The streams of grain disposed in the treatment spaces or channels between the electrode plates or plate-like elements of the multiple plate condenser are subjected for a predetermined period of time to the action of high frequency oscillations, which have a specific action on the weevil or other insects, their larvæ or pupa, whereby all such insect life is destroyed. The treated grain may then be either passed directly from the exterminator to the boot 7 for return to the receptacle 12 for re-treatment in the exterminator or for delivery from the hopper 10 to the bins 14, or the grain may be discharged from the exterminator for passage through the separator or cleaner before delivered to the boot 7 in order that all refuse material may be separated therefrom before delivery of the grain to the boot 7.

The electrode plates are supported in position by notched cleats 36 so as to be readily insertible and removable when occasion requires, and each electrode plate comprises a conducting body 37, of copper, aluminum or other suitable electric conducting material, molded in or covered by glass, porcelain, or other suitable insulating material 37'. This insulating or non-conducting material may consist of plates of glass of double thickness cemented or otherwise secured to the electrode plates and suitably sealed at the edges to prevent current leakage, such insulating material serving to prevent direct accidental contact of the material treated with the electrode plates and to increase the efficiency of operation, as the high frequency electric oscillations or radio waves will be more effective in exterminating insects in material when passed through glass than through the air. Also I have found that glass has a pronounced effect, because of its high heating reaction to high frequency oscillations of the character employed, in favoring and promoting the speed of development of internal lethal heat in the insects, and the rapidity of destruction of the insects, without injurious action on the grain or carrier material. This is due to the fact that the rise in temperature produced in the insects by the effects of the eddy currents is supplemented to a large extent by the radiant heat produced in the glass shields. In other words, the insects, when thus treated, are subjected to the dual action of being heated from within and without, thus bringing about a quick rise of temperature to the lethal point. During this treatment intervening grains of wheat are also exposed to the radiant heat from the glass, but the grain being a very poor heat conductor does not respond to temperature elevation as rapidly or to the same degree as the insects or to such a degree as to be heated to an injurious extent during the time period of treatment. The grain, therefore, will be kept comparatively cool while the insects succumb to treatment, because the insects develop a lethal temperature considerably above that developed in the carrier material. The foregoing action is quite analogous to that occurring with light waves and heat waves emanating from the sun. The light rays are invisible and likewise the heat waves are ineffective until they reach the relatively dense atmosphere of the earth. In the case of light waves, they must be reflected before they are visible. In the case of heat waves they are manifested on encountering our dense atmosphere. So it is with the high frequency electrical oscillation waves transmitted through the plate glass. This medium which is denser than the atmosphere absorbs much energy as the high frequency electrical oscillation waves pass through it which is immediately reflected in a rise of temperature because the energy so absorbed has its exact equivalent in heat. It is quite possible that by the use of ordinary glass, certain wave lengths are completely absorbed, as in the case of ultra violet rays which pass through quartz but are absorbed by ordinary glass. Another advantage incident to the use of glass is that while absorbing rays to which it has heat reactions it permits light waves to pass through it with but little diminution, which appears to be of some importance in that, in addition to resonance and developed lethal heat, invisible light or other rays have some effect in causing rapid destruction of the insects, as well as some influence producing neutralization or amplification of the natural electrical potential with which the protoplasm is endowed and upon the maintenance of which life depends. The presence of moisture in the grain also assists in increasing conductance and, in a field of high frequency oscillations, in developing temperature rise in the insects, while at the same time operating by evaporation, in the event of freedom of escape of the generated vapor, to assist in keeping the grain cool. The electrode plates 37 may be either of solid or perforate sheet metal, or be of wire or screen type of construction, or of any other construction suitable for the purpose. By the term "plate", therefore, I mean any form of plate or plate-like electrical conductor having either the form or function of an electric plate. The electrode plates are electrically connected in pairs by conductors 38 and 39 with an oscillation circuit or high frequency generator 40 and it will be evident, from the foregoing description, that the streams of grain contained in the exterminator will lie in space-charge fields and in the path of the high frequency magnetic waves passing between coacting electrodes. The purpose of dividing the main grain stream into a plurality of streams of small cross-section is not only to loosen up the grain so as to physically expose the grain to better advantage to the effect of the multiple field through which it passes, but also to increase the field strength with resulting advantages in compliance with Coulomb's law that field produced, and the arrangement of the grain in thin streams allows it to be exposed with advantage and effectiveness to the action of the high frequency oscillations, since with this construction of the treater the effective energy produced varies as the square of the distance between the platens or plates; i. e., between plates 4″ apart the effectiveness would be approximately 1/16, whereas if the plates are spaced 2″ apart the effectiveness is of the order of ¼. The insect life in the grain will thus be subjected for a proper period of time to the destructive influences of the high frequency waves, whereby all insect life in the material regardless of state of growth or degree of resistivity to the effects of the high frequency oscillations, will be destroyed during the treatment period. The grain discharged from the exterminator will, therefore, be free from insect life and may be conducted from the exterminator to the storage bins of the elevator or granary for storage therein with or without being passed through the cleaner, as occasion requires. By the treatment of the grain at an initial period, or while it is being transferred from a delivery or carrier vehicle to the elevator the insect life therein may be destroyed at a time when a comparatively small amount exists, thus preventing the great increase of insect life and the resulting ravages on the grain which occurs after the grain is stored for a period in the storage bins, for reasons above given. In the travel of the grain from point to point or bin to bin in the elevator or granary, it may also be treated, without any special movement of the grain being instituted for the purpose, so as to keep the grain either entirely free from insect life or free to such an extent as to prevent wholly or largely the losses commonly due to destruction of the grain by insect life. My invention also obviates the necessity of cooling and airing the grain for the purpose of controlling insect life multiplication, or materially reduces the number of cooling and airing steps required to keep the grain in good condition during a lengthy period, and the resulting losses in weight due to attrition of the grain as a result of contact with other surfaces and to the drying out of the grain in transit.

The drawings show a conventional schematic diagram of a power supply for the generator, assuming that it is of the alternating current type, employing rectifier tubes or valves 41 and associated instrumentalities for supplying proper currents for the cathodes and anodes of the oskilocycles or 10,000,000 cycles) or more, and by ultra-short waves are meant waves of a band between 10 meters and 6 meters (about 50,000 kilocycles or 50,000,000 cycles) and in some cases as low as 3 meters (about 100,000 kilocycles or 100,-000,000 cycles). In general the wave length ranges of from .6 to 30 meters, or frequency ranges of from 50,000 kilocycles to 10,000 kilocycles, will be found sufficient, though frequencies within the maximum and minimum ranges given may be employed. I have found that in treating grain in a thin sheet with frequencies in the order of 55,000,000 and above all insect life will succumb within one to three seconds.

Extensive study and laboratory and practical working tests made by me show that by producing high frequency oscillations of the order of ten million to fifty million, or possibly in some cases one hundred million cycles per second, and exposing the infested material to be treated to the space discharge or space field effect of such oscillations, an action will be produced through the effect of eddy currents being induced in the adult insects, eggs, larvæ, or pupa sufficient to elevate the temperature of such insects and their progeny to the point where they will succumb to the induced heat. Where the electrical conductivity of the carrier or host material treated is less than that of the insect to be destroyed, as in case of wheat and similar materials, the temperature induced in the treated carrier material, as a result of due regard being given to the working frequency and different conductivities of the carrier material and insects therein, that is, the circuit being regulated to balance the resistance or impedance of the material and to produce oscillation of a proper intensity or optimum frequency will be lower than that induced in the insect. The effect of the induced eddy currents at the optimum frequency or within the range of optimum frequencies employed under these conditions is to develop by induction in the insect, eggs, larvæ, or pupa, a temperature of from 110° to 150° F., the most effective temperatures being from 120° to 140° F., at which temperatures the insects, their eggs, larvæ or pupa are destroyed without inducing such a high temperature in the grain, or a sufficiently high temperature to effect the germinating properties of the grain, which will remain uneffected for the short period to which it is exposed during treatment. My studies and investigations have also indicated that resonance also assists in elevating the temperature of the insect as well as the induced eddy currents; in other words, that insects in the different forms may be "tuned" by proper adjustment of the circuit according to the relative degrees of conductivity of the host material and insects under treatment to resonate with certain frequencies. This resonation undoubtedly tends to temperature elevation which is additive to the temperature elevation brought about by the induced eddy currents. The period of treatment for destroying insect life in grain varies to certain degrees dependent upon the electrical conductivity of the grain and insects and the frequency used, but ordinarily ranges from two or three seconds for very high frequencies, 50,000 kilocycles and above to one or two minutes for lower frequencies, i. e., 10,000 kilocycles, during which period of time all insect life is destroyed. This period is insufficient to cause an injury to the grain by the developed temperatures, since by regulation of the frequency to the optimum frequency best suited for treatment of the materials specified and/or tuning of the circuit into resonance with the insect life contained therein, the circuit will be so adjusted with relation to the load as to produce oscillations of sufficient penetrative force to overcome the specific conductivity capacity or resistance or impedance of the carrier material of lesser conductivity and to rapidly heat the insect life of greater conductivity to lethal temperature before the host material is heated to an injurious degree.

The apparatus embodying my invention, as herein set forth, may be employed for the treatment of infested grains or cereals in elevators, granaries, warehouses and other containers for the treatment of grain while the grain is being loaded or unloaded or transferred from point to point in the elevator or other storage place, and particularly in the transit of grain from a delivery vehicle to the elevator for storage, so that the grain may be treated at the time best adapted for the purpose as well as to enable the operation to be easily, quickly and conveniently carried out, without the necessity of re-handling the grain for the purpose. The apparatus may, of course, be either in the form of permanent or temporary installations at the elevators, granaries or other plants where it is to be used, it may be of portable type so as to be used in any portion of an elevator or storage plant, and the grain conveying systems of granaries, elevators or other like grain containers may be easily modified in construction to include the exterminator so that either fixed or portable generators may be used in connection therewith for carrying out the treatment. A great advantage of this apparatus and method of treatment, besides that of economy of operation, is that it is inexpensive in construction and may therefore be supplied and installed at a comparatively low cost, is rapid in its action, allowing a large amount of material to be treated within a given time, and under all proper conditions it has no deleterious effect whatever upon the grain treated, the character and time period of treatment being such as to avoid any appreciable drying out or other deleterious effect on the grain.

In practice I have found that in the treatment action the insects are destroyed by what seems to be the effect of heat and/or some specific action on their nervous systems or vital organs of the insects by the electrical oscillations. These effects are produced by the peculiar character of the waves whatever they may be, electromagnetic, and/or electrostatic or otherwise, generated by space discharge action in a high frequency field. It is to be understood, therefore, that by the use of the expression "subjecting the grain to the action of high frequency oscillations" in "a high frequency field" or equivalent expressions in the claims, I mean any treatment action whereby and wherein the infested grain is subjected to the action of produced high frequency oscillations destructive to insect life.

While the structural organization herein shown and set forth for carrying the invention into practical effect may be effectively employed, it is to be understood that the invention is susceptible of various changes or modifications without departing from the principle or sacrificing any of the advantages of the invention, and hence I reserve the right to vary the construction, relative arrangement and the operation of the parts to material degrees so long as the same fairly fall within the spirit and scope of the appended claims.

In the present instance I have shown, for purpose of exemplification, the use of a high power push-pull type of oscillation generator including, in addition to the oscillator tubes 42, a coil 43 connected to the grid and plate circuits of the apparatus and across the terminals of the treatment condenser so as to tune or adjust the circuit to the frequency best suited for treating a given material, such as insect infested grain, but instead of employing the high frequency oscillation apparatus shown herein I may employ that shown in my aforesaid application Serial No. 608,312, executed of even date herewith, or any high power apparatus having equivalent actions. The apparatus may, however, be of that type disclosed in my application, Serial No. 580,170, and may be of the capacity of 20 kilowatts or more and be of push-pull, standing wave or any other high capacity type suitable for producing high frequency oscillations of the order and intensity required.

What I claim is:—

1. In an apparatus for transporting and treating grain, means for conducting a stream of grain to be transferred from one point to another, an exterminator in the line of feed presenting a plurality of parallel electrodes providing grain flow passages operative to divide the grain into a plurality of smaller streams and forming correspondingly shaped high frequency oscillation fields, and a high frequency oscillation generator including said electrodes for generating and passing high frequency oscillations through said fields.

2. In an apparatus for transporting and treating grain, means for conducting a stream of grain to be transferred from one point to another, an exterminator in the line of feed presenting a plurality of parallel electrodes providing grain flow passages operative to divide the grain into a plurality of smaller streams and forming correspondingly shaped high frequency oscillation fields, and a short wave generator associated with said electrodes for generating and subjecting the grain in the fields to the action of ultra-short waves of destructive frequency.

3. A high frequency electrical exterminator for destroying insect life in grain and other similar host materials comprising a casing having an inlet at its top and an outlet at its bottom, a battery of vertically arranged electrodes in said casing acting as grain dividers and forming grain channels and high frequency oscillation fields in communication with the inlet and outlet of the casing, and a vacuum tube generator of high frequency electrical oscillations connected to said electrodes and operative to produce oscillations of a frequency and intensity destructive to the insect life in the host material.

4. A high frequency electrical exterminator for destroying insect life in grain comprising a casing having an inlet and an outlet, a battery of plane electrode plates disposed in said casing between the inlet and outlet so as to form a plurality of correspondingly shaped grain receiving channels and high frequency oscillation fields, and a vacuum tube generator of high frequency electrical oscillations connected with said electrodes.

5. In an apparatus for transporting grain or other similar materials and exterminating insect life therein, means for transporting a stream of grain, an exterminator in the line of feed comprising a casing having a grain receiving outlet at its top to receive the grain from the transporting means and a grain discharge outlet at its bottom, a battery of vertically disposed spaced electrodes disposed in the casing between the inlet and outlet so as to form grain dividers and channels and high frequency fields to receive the divisions of the stream, a vacuum tube generator connected to said electrodes for generating and subjecting the grain in the channels for a predetermined period to the action of high frequency electrical oscillations, and means for discharging the treated grain from the outlet of the casing for continued movement by the transporting means.

6. In an apparatus for transporting a grain stream and exterminating insect life therein, means for transporting a stream of grain, an exterminator in the line of feed having spaced electrodes forming grain receiving channels and high frequency oscillation fields, a high frequency generator including said electrodes for producing and subjecting the grain in the fields to the action of high frequency oscillations, and a time-controlled valve device for discharging the grain from the channels after having been subjected for a predetermined period to the action of the high frequency oscillations.

7. In an apparatus for transporting a grain stream and exterminating insect life therein, means for transporting a stream of grain, an exterminator in the line of feed having spaced electrodes forming grain receiving channels and high frequency oscillation fields, a high frequency generator including said electrodes for producing and subjecting the grain in the fields to the action of high frequency oscillations, an automatic valve controlling the feed of grain to the channels, and a time-controlled valve device for discharging the grain from the channels after having been subjected for a predetermined period to the action of the high frequency oscillations.

8. In an apparatus of the character described, an exterminator having electrodes forming a plurality of parallel grain channels and high frequency oscillation air gaps, and a high frequency oscillation generator including said electrodes for producing and subjecting the grain in said gaps to the action of high frequency oscillations of lethal frequency.

9. An insect exterminator of the character set forth in claim 8 wherein each of said electrodes comprises a metallic conductor provided with a shield covering of non-conducting material.

10. In an apparatus for treating grain for extermination of insect life therein, an exterminator presenting a plurality of parallel electrodes providing grain flow passages operative to divide a stream of grain into a plurality of smaller streams and forming correspondingly shaped high frequency oscillation field gaps, and a high frequency oscillation generator including said electrodes for generating and passing high frequency oscillations through the field gaps and the grain therein.

11. In an apparatus for treating grain for extermination of insect life therein, an exterminator having spaced electrodes forming a plurality of grain receiving channels and operative to divide a stream of grain into smaller streams and guide the same into said channels, means for subjecting the grain in the channels for a predetermined period to the action of high frequency electrical oscillations, means for selectively varying the time period, and means for automatically discharging the treated grain from the channels at the completion of the time period.

12. An apparatus for treating grain for the extermination of insect life therein, comprising a plurality of plane electrodes of alternating polarity arranged in spaced relation in parallel vertical planes and forming terminals of a group of units of a high frequency oscillation circuit, and means including said terminals for subjecting the grain in the field spaces between the terminals to the action of high frequency oscillations of destructive frequency passing between such electrodes.

13. The method of treating grain for the extermination of insect life therein, which consists in disposing streams of grain of comparatively small cross-section in a series of high frequency oscillation field gaps arranged side by side, simultaneously subjecting the grain in such field gaps to the effect of ultra-short waves for a time period governed by the action of an agency regulated by the volume and weight of the grain in the gaps, and then by the action of such agency discharging the grain from the gaps.

14. An apparatus for treating grain for the extermination of insect life therein, comprising means for feeding a stream of grain along a course, means for periodically arresting the feed of the stream at a point in the course, and segregating a portion of the stream, a plurality of parallel high frequency oscillation field terminals of opposing polarity alternating in arrangement with each other and forming correspondingly arranged field spaces, means including said terminals for subjecting the grain in such field spaces to the action of high frequency electrical oscillations of destructive frequency, and means for discharging the treated grain from the high frequency oscillation field spaces and forming a stream therefrom similar to the original stream, and continuing the feed of the stream.

15. In an apparatus for transporting grain and treating the same for extermination of insect life therein during its course of travel, a transporting system, and an insect exterminator in the line comprising a casing, a bank of electrodes arranged in parallel vertical planes in said casing and forming a plurality of parallel grain receiving channels and high frequency oscillation field gaps, and a high frequency oscillation generator including said electrodes for generating and passing high frequency oscillations of destructive frequency through said field gaps.

16. In an apparatus for transporting grain and treating the same for extermination of insect life therein during its course of travel, a transporting system, and an insect exterminator in the line thereof comprising a casing, a bank of electrodes arranged in parallel vertical planes and forming a plurality of passages and high frequency oscillation field gaps to receive the grain exposed for treatment, and a high frequency oscillation generator including said electrodes for generating and passing high frequency oscillations of destructive frequency through said field gaps.

17. In a high frequency treatment apparatus, a casing, a battery of electrodes in said casing forming a plurality of high frequency oscillation field gaps arranged in parallel planes, and a generator of high frequency electric oscillations including said electrodes for generating a high frequency destructive to insect life and passing the same through said field gaps.

18. An apparatus for destroying insect life in all forms in insect infested material, comprising a casing having an inlet and an outlet multiple condenser disposed in said casing and formed of a plurality of spaced electrodes providing field spaces for holding bulk charges of the material in sheet divisions, and a short-wave oscillation generator circuit including said condenser and containing an electrical capacitance and a reactance in parallel and operative for producing in said fields high frequency electrical oscillations of a frequency and intensity to overcome the sum of the impedance of the material in the several fields and to produce lethal heat in the insects therein.

19. An apparatus for destroying insect life in grain and other like infested materials, comprising a battery of spaced parallel plate-like electrode elements forming grain receiving compartments and electrostatic fields, and a short wave electron valve high frequency oscillation generator circuit including said electrode elements and operative to produce and impress upon said electrode elements high frequency oscillations of a frequency and intensity regulated with relation to the conductivity of the insect life and impedance of the field load to rapidly penetrate the material and produce by induced currents lethal heat in such insect life.

20. In an apparatus for exterminating insects in grain and other similar host materials, an exterminator comprising a casing having an inlet and an outlet, a plurality of electrodes of alternating polarity arranged in spaced relation in said casing so as to form a plurality of high frequency oscillation fields for holding charges of the material in sheet form, a short wave generator including said electrodes for generating and subjecting the grain in the fields to the action of short waves of a frequency and intensity suitable to overcome the sum of the impedance of the material in the fields and to destroy the insect life therein.

21. An apparatus for treating grain for the destruction of insect life therein, comprising a casing having an inlet and an outlet, a multiple condenser in said casing consisting of a plurality of parallel plate electrodes forming high frequency oscillation field terminals of opposing polarity alternating in arrangement with each other and forming correspondingly arranged grain dividers and high frequency field spaces, and a short wave high frequency generating circuit including said terminals for subjecting the grain in such field spaces to the action of high frequency electrical oscillations of destructive frequency to the insect life therein.

JESSE H. DAVIS.